Patented May 20, 1930

1,759,700

UNITED STATES PATENT OFFICE

MAURICE KAHN, OF PARIS, AND ELIANE LE BRETON AND GEORGES SCHAEFFER, OF STRASBOURG, FRANCE

PRODUCT FOR TANNING AND TAWING INDUSTRIES AND PROCESS FOR ITS MANUFACTURE

No Drawing. Application filed April 22, 1926, Serial No. 103,960, and in France November 20, 1923.

This invention has for its object products intended to be used specially in tanning and tawing industries and their process of manufacture, and this application is, as to part of its subject-matter, a continuation of our application which matured to Patent No. 1,724,027, granted August 13, 1929, for "improved process for industrial use of inferior vegetables".

These products consist of an intimate mixture, an emulsion or emulsions of fatty bodies, oils, soaps or saponifiable matters with cellulosic residues of lower vegetables or yeasts such as brewer's or distiller's yeast, Rhizopus or amylomyces deprived of the whole or substantially so of their plasma, in presence of a certain amount of water. In some cases the substances treated contain sufficient water to form an emulsion; but where otherwise, the amount of the deficiency must, of course, be added.

Indeed we have discovered that such cellulosic residues are extremely unctuous when retaining water and possess remarkable emulsifying power as regards greases, oils, soaps, and the like.

According to this invention, this emulsifying property is employed for preparing the products above referred to preferably in the following manner. Cellulosic residues of yeasts such as brewer's or distiller's yeast, Rhizopus or amylomyces or the like deprived of the whole or substantially so of their plasma and retaining water, for example 86%, are heated to about 50° C. and are, together with greases, soaps, or the like, heated to between 40° and 80° C. according to their fluidity, worked up in mixers or mechanical kneading troughs. The proportion and quality of the greases, soaps, or the like, will vary in accordance with the nature of the products it is desired to obtain. They may be pure glycerides or mixtures of glycerides with more or less oxidized fatty acids, soaps and unsaponifiable matter. The action of the ferments such as oxydases which may be sometime still present in the vegetable residues, can be arrested by rapidly heating to 80° C. before the working up. In order to prevent putrefaction of the products such antiseptic or antiseptics may be added, for example, sodium fluoride, thymol, chloroform, etc. as have no prejudicial action on leather, when the products as above set out are employed in the tanning and tawing industries.

The cellulosic residues wanted for the manufacture of these products may be prepared by any convenient means, for example, by autolysing yeasts such as brewer's or distiller's yeast, Rhizopus or amylomyces or the like and separating by filtration or any equivalent means, the autolysate from the undigested mass. Or they may be obtained in treating in a stove brewer's or distiller's yeast, Rhizopus, amylomyces or the like by sodium carbonate and filtering the mass in order to separate the cellulosic residues from the liquid portions containing the freed albuminous substance. Or again the cellulosic residues may be prepared by a mixed digestion of brewer's or distiller's yeast, Rhizopus, or amylomyces, together with animal substance, such as fish, containing greases and sieving and filtering the mass in order to separate the skeleton of the fish and the autolysate. In that case the cellulosic residues remaining on the filter have already emulsified at least a part of the greases and oils of the fish. They are used in that case in the same manner as cellulosic residues containing no greases.

What we claim is:

1. Products useful in tanning and tawing industries comprising a mixture of softening substances, emulsifiable fatty bodies, water and cellulosic residues of lower vegetables, substantially deprived of their albuminoid substances.

2. Products useful in tanning and tawing industries comprising a mixture of emulsifiable fatty bodies, water and cellulosic residues of lower vegetables such as yeasts, substantially deprived of their albuminous substances.

3. Products useful in tanning and tawing industries comprising a mixture of emulsifiable fatty bodies, water and cellulosic residues of yeast substantially deprived or its albuminous substances.

4. Products useful in tanning and tawing industries comprising a mixture of emulsifiable fatty bodies, water and cellulosic residues of brewer's yeast substantially deprived of its albuminous substances.

5. Products useful in tanning and tawing industries comprising a mixture in the state of an emulsion of softening substances, emulsifiable fatty matters, water and cellulosic residues of lower vegetables such as yeasts, substantially deprived of their albuminoid substances.

6. Process for the manufacture of products useful in tanning and tawing industries comprising mixing softening substances, emulsifiable fatty matters, water and cellulosic residues of lower vegetables such as yeasts, substantially deprived of their albuminoid substances.

7. Process for the manufacture of products useful in tanning and tawing industries comprising mixing emulsifiable fatty bodies, water and cellulosic residues of lower vegetables substantially deprived of their albuminoid substances.

8. Process for the manufacture of products useful in tanning and tawing industries comprising mixing fatty bodies, water and cellulosic residues of yeast substantially deprived of its albuminous substances.

9. Process for the manufacture of products useful in tanning and tawing industries comprising mixing fatty bodies, water and cellulosic residues of brewer's yeast substantially deprived of its albuminoid substances.

10. Process for the manufacture of products useful in tanning and tawing industries comprising mixing emulsifiable fatty bodies with water and cellulosic residues of lower vegetables substantially deprived of their albuminoid substances, until the mass is brought to the state of an emulsion.

11. Process for the manufacture of products useful in tanning and tawing industries comprising heating cellulosic residues of lower vegetables substantially deprived of their albuminous substances but containing water, heating softening substances such as fatty bodies and mixing them with the heated cellulosic residues.

12. Process for the manufacture of products useful in tanning and tawing industries comprising heating to about 50° C. cellulosic residues of lower vegetables substantially deprived of their albuminous substances but containing water, heating emulsifiable fatty matters to 40 to 80° C., and mixing them with the heated cellulosic residues.

13. Process for the manufacture of products useful in tanning and tawing industries comprising mixing emulsifiable fatty bodies and cellulosic residues of lower vegetables substantially deprived of their albuminoid substances, and adding such an antiseptic as have no prejudicial action on leather.

14. Process for the manufacture of products useful in tanning and tawing industries comprising mixing softening substances, such as fatty bodies, with water and cellulosic residues of lower vegetables substantially deprived of their albuminoid substances, and mixing the so obtained product with further softening substances of the kind described.

15. Process for the manufacture of products useful in tanning and tawing industries comprising mixing cellulosic residues of brewer's yeast deprived by an autolysis of their albuminoid substances and heated to about 50° C. with fatty bodies heated between 40° and 80° C. until the mass is brought to the state of an emulsion.

In testimony whereof we have affixed our signatures.

MAURICE KAHN.
ELIANE LE BRETON.
GEORGES SCHAEFFER.